(12) United States Patent
Blakley

(10) Patent No.: US 7,802,807 B2
(45) Date of Patent: Sep. 28, 2010

(54) HITCH SECUREMENT SYSTEM

(76) Inventor: Michael C. Blakley, 920 Quince Ave., Boulder, CO (US) 80304

( * ) Notice: Subject to any disclaimer, the term of this patent is extended or adjusted under 35 U.S.C. 154(b) by 253 days.

(21) Appl. No.: 12/046,211

(22) Filed: Mar. 11, 2008

(65) Prior Publication Data
US 2009/0230656 A1 Sep. 17, 2009

(51) Int. Cl.
B60D 1/04 (2006.01)
(52) U.S. Cl. .................. 280/506; 280/495; 280/507
(58) Field of Classification Search ............. 280/495, 280/506, 507; 403/378, 379.3, 109.4
See application file for complete search history.

(56) References Cited

U.S. PATENT DOCUMENTS

| 5,593,172 | A | * | 1/1997 | Breslin | 280/506 |
| 5,615,904 | A | * | 4/1997 | Van Dusen et al. | 280/506 |
| 6,186,531 | B1 | * | 2/2001 | Parent | 280/506 |
| 6,733,029 | B2 | * | 5/2004 | McCoy et al. | 280/506 |
| 7,004,491 | B1 | * | 2/2006 | Allsop et al. | 280/506 |
| 7,338,065 | B1 | * | 3/2008 | Clausen | 280/507 |
| 7,600,774 | B1 | * | 10/2009 | Speer et al. | 280/506 |
| 2006/0119074 | A1 | * | 6/2006 | Makos et al. | 280/507 |
| 2009/0014983 | A1 | * | 1/2009 | McKendry | 280/506 |

* cited by examiner

Primary Examiner—Lesley Morris
Assistant Examiner—Michael R Stabley

(57) ABSTRACT

Embodiments of the invention relate to securing hitch appliances to a hitch receiver. In one embodiment, a hitch unit includes a frame including first and second wall regions, the first wall region having a first through hole and the second wall region having a second through hole, and first and second units in the frame configured to extend a pin coupled to the second unit through the second through hole when an implement is coupled to the first unit and operated.

15 Claims, 3 Drawing Sheets (SECTION C-C, COLLAPSED)

(SECTION C-C, EXTENDED)

(SECTION A-A, EXTENDED)

HITCH SECUREMENT SYSTEM

BACKGROUND

1. Technical Field

The subject matter disclosed herein generally relates to vehicle hitches. More specifically, the subject matter relates to methods and apparatuses for securing a hitch connection.

2. Information

In order to transport a nearly unlimited variety of items, millions of people around the world attach hitch appliances (e.g., trailers, cargo carriers, and bike racks) to vehicles. In some instances, a receiver unit such as a square tube may be bolted or welded to the vehicle frame, and a hitch bar may be placed into the receiver tube. Typically, the coupling may be completed using a pin that extends through holes in the receiver tube and the hitch bar. The hitch bar may be a part of the appliance that is being hitched, or a ball or other device may be fastened to the hitch bar and the appliance may be secured to the ball or other device. In any event, the typical coupling between the hitch bar and receiver tube may cause undesirable rattling as the hitch bar moves within the receiver tube.

BRIEF DESCRIPTION OF THE DRAWINGS

Embodiments are illustrated by way of example and not by way of limitation in the figures of the accompanying drawings, in which like references may indicate similar elements and in which.

DETAILED DESCRIPTION

Figure 1:
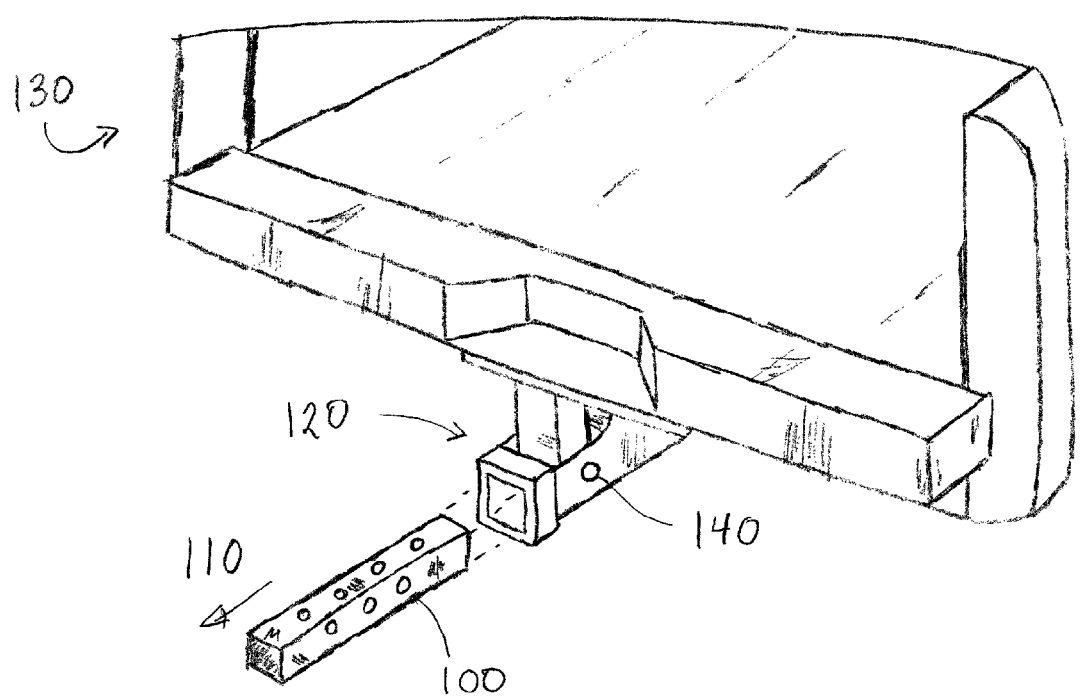
FIG. 1 illustrates a hitch securement apparatus according to an embodiment.

In the following description, various embodiments will be disclosed. However, it will be apparent to those skilled in the art that the embodiments may be practiced with all or only some of the disclosed subject matter. For purposes of explanation, specific numbers and/or configurations are set forth in order to provide a thorough understanding of the embodiments. However, it will also be apparent to one skilled in the art that the embodiments may be practiced without one or more of the specific details, or with other approaches and/or components. In other instances, well-known structures and/or operations are not shown or described in detail to avoid obscuring the embodiments. Furthermore, it is understood that the embodiments shown in the figures are illustrative representations and are not necessarily drawn to scale.

References throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner. Various operations may be described as multiple discrete steps in turn, in a manner that is most helpful in understanding the claimed subject matter. However, the order of description should not be construed as to imply that these operations are necessarily order dependent.

In various embodiments of the claimed subject matter, an improved vehicle hitch and associated methods for securing a hitch appliance are described. In an embodiment, a hitch unit may include a frame that is configured to fit within a hitch receiver. The frame may include a first through hole that may expose a first unit within the frame and a second through hole that may expose a second unit within the frame. The frame may be placed within the hitch receiver unit such that the first through hole aligns with a through hole in the hitch receiver (a through hole in the hitch receiver may be commonly provided for a standard hitch pin).

Upon the operation of an implement that may be extended through the first through hole, the first unit may move within the frame tube. In one example, the first unit may move in the direction of the first through hole. The operation of the implement may cause a side of the frame tube to snug against an inside wall of the receiver hitch in an example where a flanged bolt (or a bolt and a washer) is used. Upon such movement of the first unit, the first unit may engage the second unit, and may cause the second unit to move and extend a pin fixed to the second unit to extend through the second through hole and into contact with a wall of the receiver hitch. As the pin fixed to the second unit contacts and tightens against a wall of the receiver hitch, the surface of the frame tube opposite the securement pin may be secured against the opposite wall of the receiver hitch. By such apparatus and methods, one, two, three, or more walls of the receiver hitch may be securely engaged by the hitch unit (either by the frame tube of the hitch unit or by hitch unit pins). Such securement of the hitch unit may reduce or eliminate rattling of the hitch unit and any attached hitch appliance.

Turning now to FIGS. 1-2, various embodiments will be described. As illustrated in FIG. 1, a hitch receiver unit 120 may be attached to a vehicle 130. Vehicle 130 may be any vehicle capable of towing or supporting a hitch apparatus, such as, but not limited to a pick up truck (as shown), car, sports utility vehicle (SUV), motorcycle, all terrain vehicle (ATV), van, or bicycle. As shown, hitch receiver unit 120 may have a substantially square opening, such as the opening of a standard square tubing. However, any shape of opening, such as substantially rectangular, oval, or round openings, may be used. Further, hitch receiver unit 120 may be of any size and/or classification. In various examples, hitch receiver unit 120 may be a class I hitch (capable of supporting up to 2,000 lb. and having an approximately 1.25 square inch opening), class II hitch (up 3,500 lb., 1.25 square inch opening), class III hitch (up to 5,000 lb., 2.0 square inch opening), class IV hitch (up to 10,000 lb., 2.0 square inch opening), or any of the international standard organization (ISO) hitch classifications.

Hitch receiver unit 120 may include a through hole 140 (and a through hole opposite through hole 140 that is not shown in the perspective of FIG. 1). Such through holes may typically be present to provide access for a hitch pin, such as a bent pin. As shown, a hitch securement apparatus 100 may be placed and secured within hitch receiver unit 120 as is discussed in further detail below. Hitch securement apparatus 100 may be an integrated part of or attached to a variety of hitch appliances (not shown for the sake of clarity) that may extend off hitch securement apparatus in direction 110. In one example, the hitch appliance may include a trailer. In another example, the hitch appliance may include a ball mount, to which a variety of trailers may be attached (such ball mountable trailers may also be considered hitch appliances). In other examples, hitch appliances such as, but not limited to, bike racks, ski racks, snowboard racks, or carrier racks may be used.

Figure 2A:
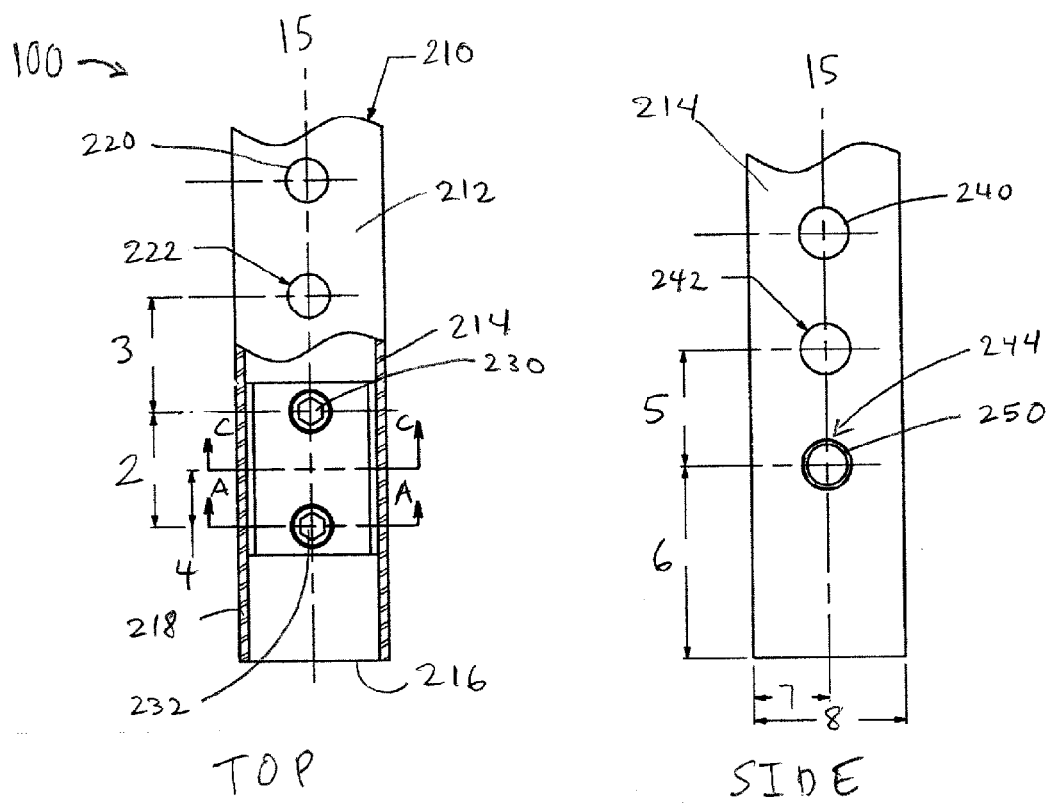
FIG. 2A illustrates a top-down view and a side view of a hitch securement apparatus according to an embodiment.
Figure 2B:
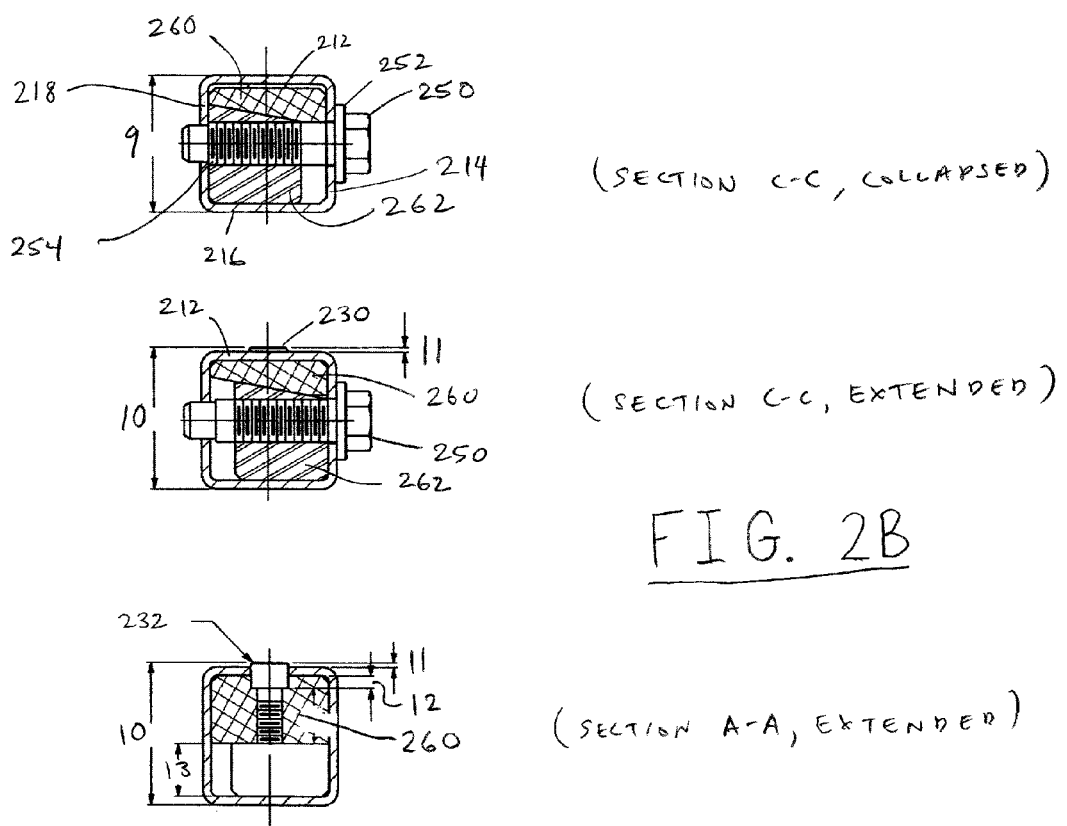
FIG. 2B illustrates a cross-sectional view of the hitch securement apparatus embodiment of FIG. 2A in a collapsed configuration and an extended configuration, and a second cross-sectional view of the hitch securement apparatus embodiment of FIG. 2A in an extended configuration.

Referring now to FIGS. 2A-2B, a hitch securement apparatus according to an embodiment is illustrated in greater detail. As shown in a top-down view in FIG. 2A, hitch securement apparatus 100 may include a frame 210 having wall regions 212, 214, 216, and 218. Wall region 212 may be considered a top wall, wall region 216 may be considered a bottom wall, and wall regions 214, 218 may be considered side walls. However, terms used in this description such as top, side, bottom, and the like are merely used for convenience and to more fully explain the embodiments. Such terms are not meant to be limiting, and, in particular, the described embodiments may be used in any orientation.

In the illustrated example, frame 210 may be substantially square in cross-section and may be considered a square frame tube having four relatively flat walls that adjoin at edges. In other examples, frame 210 may be substantially rectangular in cross-section and may similarly have four relatively flat walls that adjoin at edges. In still other examples, frame 210 may be round or rounded in cross-sections and may have one surface around the frame, and the one surface may be considered to have two, three, four or more wall regions.

As is shown in the top view, wall region 212 may include one or more through holes such as through holes 220, 222, and additional through holes substantially aligned with pins 230, 232 which are not shown due to the cutaway view of FIG. 2A. In various examples, one, two, three, four, or more through holes may be used in wall region 212. A through hole or multiple though holes in wall region 212 may provide openings such that one or more pins, including pins 230, 232, may protrude through frame tube 210 during operation of the hitch unit, as is further discussed below. Pins that may protrude through openings 220, 222 are not shown for clarity of illustration. As shown in the side view of FIG. 2A, wall region 214 may include a plurality of through holes such as through holes 240, 242, and 244. In various examples, one, two, three, or more through holes may be provided in wall region 214. The through holes may provide access to a unit within frame tube 210 for an implement 250, which may be used to operate various embodiments.

The operation of hitch securement apparatus 100 will now be described with reference to FIG. 2B, which illustrates two cross-sections (section C-C and section A-A, as shown in FIG. 2A) of hitch securement apparatus 100. Further, cross-section C-C is illustrated in two positions-collapsed and expanded. Cross-section A-A is shown in the expanded position. FIG. 2B illustrates a unit 260 and a unit 262 in frame tube 210. Unit 262 may be accessible by implement 250 via any of the openings in wall region 214. In the illustrated example, implement 250 may access unit 262 via hole 244.

As shown in the cross-section C-C collapsed view, when in a collapsed position, unit 262 may be located substantially toward wall region 218 and unit 260 may positioned such that a pin or pins do not extend through wall region 212. Upon operation of implement 250, unit 260 may be caused to move. In the illustrated example, unit 262 moves toward wall region 214 due to the threads 254 of implement 250 operating within receiving threads of unit 262 (not shown) while implement 250 is rotated. Moving unit 262 thereby causes unit 260 to move toward wall region 212 and to extend pin 230 (and other pins, if any) through wall region 212. The movement of unit 260 may be caused by a surface of unit 262 engaging a surface of unit 260, with both surfaces being sloped or angled to cause substantially perpendicular motion between units 260, 262. In particular, in the illustrated example, units 260, 262 may include wedges or wedge portions that have flat surfaces that are substantially in contact. When unit 262 is operated, the wedge of unit 262 may apply a force to the wedge of unit 260 and may cause wedge unit 260 to move.

When the hitch securement apparatus is placed in a hitch receiver (see FIG. 1) and operated as described, pin 230 may be pressed and secured against an inside wall of the hitch receiver, which may cause wall region 216 to be pressed and secured against an opposite inside wall of the hitch receiver unit. In the illustrated example, the securement pin or pins may be pressed against the top of the hitch receiver and the frame wall opposite the securement pin or pins may be pressed against the bottom of the hitch receiver. Such securement may provide a hitch that is secured against undesired rattling.

As illustrated, implement 250 may be a bolt having a flange 252 and a thread 254. Providing a flanged, threaded bolt may provide various advantages. For example, flanged, threaded bolts may be easily obtainable and therefore easily replaced if lost or damaged. Also, in operation, in examples where the flanged, threaded bolt is extended through a through hole in a hitch receiver unit (as shown in FIG. 1), the flange may be configured to catch on the frame of hitch receiver unit 120 around through hole 140. When the bolt is operated, the entirety of the hitch securement apparatus 100 may be pulled toward an inside wall of hitch receiver unit 120, thus providing a third surface of securement and further securing hitch securement apparatus 100 within hitch receiver unit 120. In another example, a washer in combination with either a flanged or standard bolt may be used in a similar manner. Also, as shown in FIG. 2B, implement 250 may extend entirely through frame 210 (via a through hole in wall region 218) and may extend entirely through the hitch receiver unit (not shown in FIG. 2B). By extending through the hitch receiver unit, the implement may act as a securement pin in case of any failure of the hitch.

Further, implement 250 may be any implement that causes unit 262 to move when operated. In some examples, implement 250 may be a hex wrench tool that may be extended into frame 210 and operated to move unit 262, for example by fitting within a tube unit having an outside threading (that may mate with threading of unit 262) and an inside shape for receiving a hex wrench tool. Using a hex wrench tool or similar implement may offer the advantage of not requiring a second tool to operate the hitch securement apparatus. In another example, implement 250 may include a unique key shape (and the unit 262 may include a corresponding key shape) to provide security against theft for the hitch securement apparatus and the attached hitch appliance. In examples where a tool is used as the implement, the tool may either be removed or it may remain to act as a securement pin in case of a hitch connection failure.

As shown in the cross-section A-A extended view, pin 232 (and any other pins configured to extend through wall region 212) may be attached to unit 260 by a threaded attachment. Such an attachment may offer certain advantages including the ability to replace the pins upon damage and ease of assembly of the hitch securement apparatus (by fitting unit 260 into the frame without the pins attached). In an example, the pins may be socket head cap screws. In other examples, the pins may be an integrated part of unit 260, either machined as a part of the unit, or welded to the unit. Further, as is evident in the cross-section A-A extended view, although units 260, 262 may include surfaces that mate to cause motion between them, and in some examples, those surfaces may be the part of wedges (for example in the cross-section C-C extended view), those surfaces or wedges may or may not extend down length of the hitch securement apparatus. In particular, wedges or surfaces configured to effect motion between the units may only be at certain positions along the length of the frame of the securement apparatus. In one example, those surfaces or wedges may be positioned approximately at the location(s) of access for implement 250.

Referring to FIG. 2A, in the illustrated example, through holes in wall region 212 are shown offset with through holes in wall region 214 with respect to a long axis 15 of the frame. For example, through hole 220 is at a different position along long axis 15 relative to through hole 240. In other examples, the through holes on wall regions 212, 214 may be in substantially the same position along long axis 15.

Further, in the described embodiment of FIGS. 2A-2B, unit 262 is shown moving toward wall region 214. However, in other examples, the sloped surfaces may be configured such that unit 262 moves toward wall region 218 and thereby causes unit 260 to extend toward wall region 212. In particular, in the illustrated example, the surfaces may be angled to generally slope from the edge formed by wall regions 212, 218 toward the edge formed by wall regions 214, 216 to facilitate a movement of unit 260 toward wall region 212 upon the movement of unit 262 toward wall region 214. In another example, the surfaces may be angled to generally slope from the edge formed by wall regions 212, 214 toward the edge formed by wall regions 216, 218 to facilitate movement of unit 260 toward wall region 212 upon the movement of unit 262 toward wall region 218.

Although only one through hole in wall region 214 and one through hole in wall region 212 may be needed to practice an embodiment, multiple through holes may provide certain advantages. For example, multiple through holes may allow the user to select how far the hitch securement apparatus extends into a hitch receiver unit. With reference to FIG. 1, by providing multiple through holes, the user may select which through hole aligns with through hole 140 and thereby control how far away a hitch appliance is from the vehicle. Therefore, the user may select different positions for the hitch unit. Such advantage may be evident when used with vehicles having various degrees of clearance around hitch receiver unit 120. In other examples, through hole 140 may not be provided and a through hole in wall region 214 may be accessed by setting hitch securement apparatus 100 into hitch receiver unit 120 such that a through hole in wall region 214 is accessible from outside hitch receiver unit 120. In such examples, multiple through holes may again provide for the user to set the distance of a hitch appliance from the vehicle. In addition, multiple through holes may provide for sufficient frame to extend into the hitch receiver unit to provide a secure connection. Also, multiple securement pins may provide for greater connection strength between the hitch unit and the hitch receiver.

Next, a variety of measurements will be given for an example embodiment. It will be appreciated that the measurements are for one example only and are given for purposes of clarity of explanation. In particular, different measurements may be used in other examples. Referring first to FIG. 2B, dimension 9 may be about 2.000 inches, which may relate to a standard 2 inch square frame tube (accordingly dimensions 7, 8 as shown in FIG. 2A may be about 1.000 inches and 2.000 inches, respectively). As discussed, in the collapsed position, securement pins may be within the frame. In the extended position, pin 230 may extend out from the frame tube by a dimension 11, which may be about 0.068 inches. Similarly, dimension 10 may be about 2.068 inches. In operation, full travel of units 260, 262 may not be required to secure the hitch unit within the hitch receiver. Additionally, dimensions 12, 13 may be about 0.184 and 0.75 inches, respectively. With reference to FIG. 2A, through holes in wall region 212 may have diameter of about 0.563 inches and they may have a spacing or pitch dimensions 2, 3 of about 1.500 inches between their centerlines (dimension 4, accordingly, may be about 0.750 inches). Through holes in wall region 214 may have diameters of about 0.656 inches and may have pitch dimensions 5 of about 1.500 inches. Also a dimension 6 of about 2.500 inches may be provided at the end of the hitch unit.

As described, the disclosed embodiments of hitch securement methods and apparatuses may provide secure hitch connections that are free of undesirable rattling, and generally provide secure hitch connections.

While there has been illustrated and/or described what are presently considered to be example embodiments, it will be understood by those skilled in the art that various other modifications may be made, and/or equivalents may be substituted, without departing from the true scope of claimed subject matter. Additionally, many modifications may be made to adapt a particular situation to the teachings of claimed subject matter without departing from subject matter that is claimed. Therefore, it is intended that the patent not be limited to the particular embodiments disclosed, but that it covers all embodiments falling within the scope of the appended claims.

What is claimed is:

1. An apparatus for securing a hitch appliance to a hitch receiver, the apparatus comprising:
   a frame including a first wall having a first through hole and a second wall having a second through hole;
   a first unit in the frame configured to be coupled to an implement extended through the first through hole, wherein the first unit and the implement are configured to move the first unit within the frame when the implement is operated; and
   a second unit in the frame coupled to a pin, wherein at least a portion of the first unit includes a first surface substantially in contact with a second surface of the second unit, and wherein the first surface and the second surface are configured to extend the pin through the second through hole upon moving the first unit.

2. The apparatus of claim 1, wherein the first surface is a surface of a wedge of the first unit and the second surface is a surface of a wedge of the second unit.

3. The apparatus of claim 2, wherein the first through hole and the second through hole are at different positions along a long axis of the frame.

4. The apparatus of claim 3, wherein the wedge of the first unit, the wedge of the second unit, and the first through hole are at approximately the same position along the long axis of the frame.

5. The apparatus of claim 2, wherein the first through hole and the second through hole are at approximately the same position along a long axis of the frame.

6. The apparatus of claim 1, wherein the second wall comprises a third through hole and the second unit is coupled to a second pin, and wherein the second pin is configured to extend through the third through hole upon the moving of the first unit.

7. The apparatus of claim 6, wherein the second wall comprises a fourth through hole and a fifth through hole and the first wall comprises a sixth through hole and a seventh through hole, and wherein the second unit comprises a third pin and a fourth pin both configured to extend through the fourth through hole and the fifth through hole, respectively, upon moving the first unit.

8. The apparatus of claim 1, wherein the implement comprises a flanged bolt configured to be secured against the hitch receiver when extended through a hitch receiver through hole.

9. The apparatus of claim 1, wherein the implement comprises a keyed tool and the first unit includes a shape corresponding to the keyed tool.

10. The apparatus of claim 1, wherein the implement comprises a hex wrench tool and the first unit includes a threaded hole coupled to a threaded unit having an opening having a shape corresponding to the hex wrench tool.

11. The apparatus of claim 1, wherein the implement comprises a threaded bolt and the first unit comprises a threaded hole.

12. An apparatus for securing a hitch appliance to a hitch receiver, the apparatus comprising:
   a frame including a first wall having a first through hole and a second wall having a second through hole;
   a first unit in the frame configured to be coupled to an implement through the first through hole, wherein at least part of the first unit includes a first wedge, and wherein the first unit and the implement are configured to move the first unit when the implement is operated; and
   a second unit in the frame coupled to a pin, wherein at least part of the second unit includes a second wedge, and wherein the first wedge and the second wedge are configured to extend the pin through the second through hole upon moving the first unit.

13. The apparatus of claim 12, wherein the implement comprises a bolt configured to extend through a third through hole in the frame, the third through hole being opposite the first through hole.

14. The apparatus of claim 12, wherein the pin is an integrated part of the second unit.

15. The apparatus of claim 12, further comprising:
   at least one of a bike rack, a ski rack, or a ball-mount system adapted to be coupled to the apparatus.

* * * * *